Nov. 3, 1936.  J. H. S. PARKER ET AL  2,059,900

FILM PACK

Filed Feb. 12, 1936  2 Sheets-Sheet 1

INVENTORS
J. Henry S. Parker & William N. Schuler
BY
ATTORNEYS

Nov. 3, 1936.  J. H. S. PARKER ET AL  2,059,900
FILM PACK
Filed Feb. 12, 1936  2 Sheets-Sheet 2
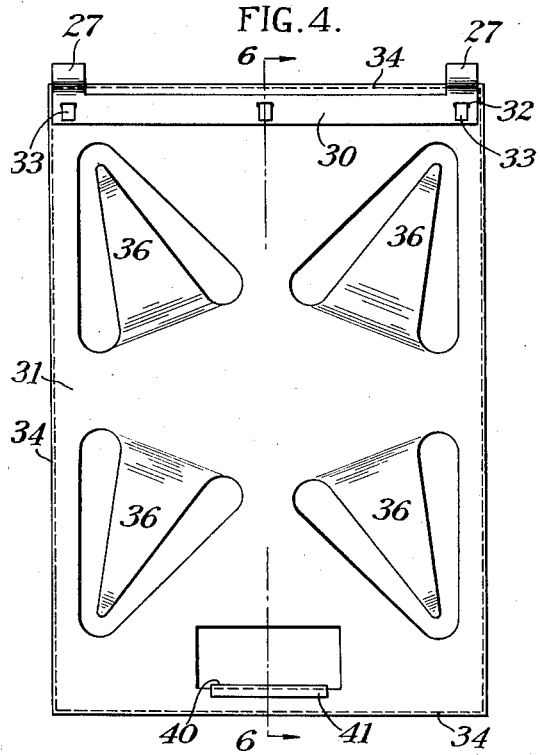
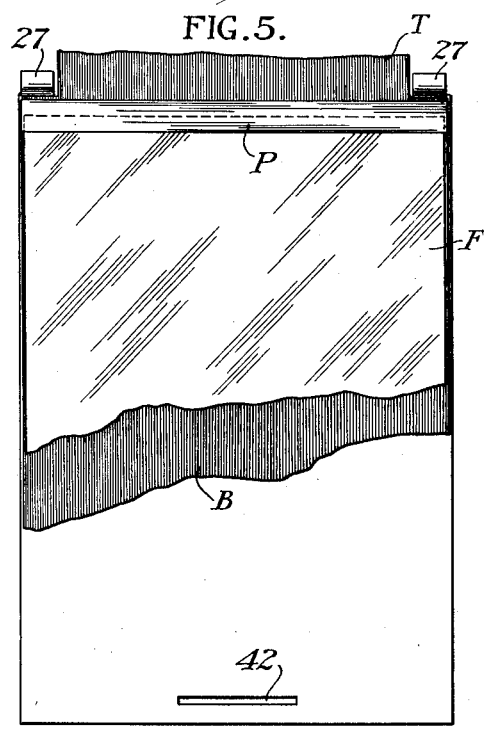
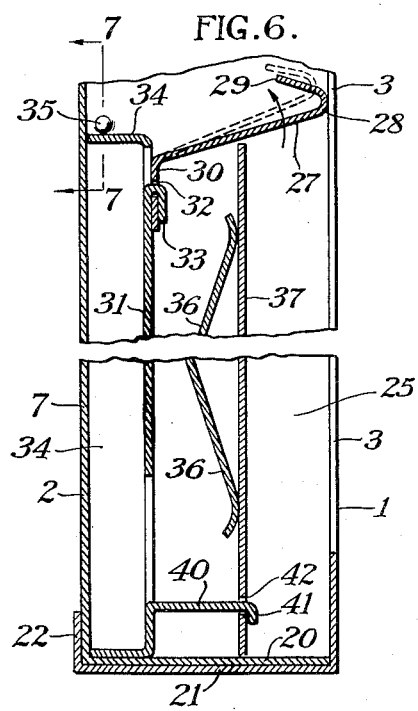
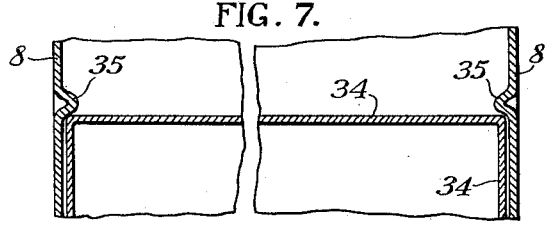
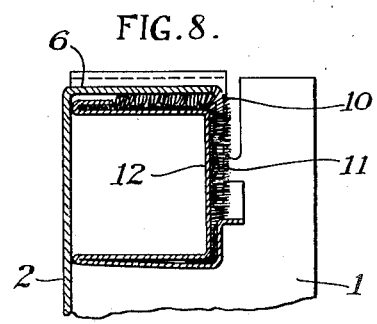
INVENTORS
J. Henry S. Parker & William N. Schuler
BY
ATTORNEYS.

Patented Nov. 3, 1936

2,059,900

UNITED STATES PATENT OFFICE 2,059,900

FILM PACK

J. Henry S. Parker and William N. Schuler, Rochester, N. Y., assignors, by mesne assignments, to Eastman Kodak Company, Jersey City, N. J., a corporation of New Jersey Application February 12, 1936, Serial No. 63,614

16 Claims. (Cl. 95—22)

This invention relates to photography and more particularly to photographic film packs. One object of our invention is to provide a film pack which is suitable for use with either flexible or stiff film. Another object of our invention is to provide a film pack having an elongated housing divided into two parts or sections, one part being adapted to contain the unexposed film and the other part being adapted to contain exposed film. Another object of our invention is to provide a film pack in the form of an elongated housing divided into two parts by means of spring latch members which will permit films to pass from one part to the other. Another object is to provide a latch construction of the type described in which films may be moved past the latch members in one direction only. Still another object of our invention is to provide a simple and inexpensive type of film pack which will hold films flat for exposure and which can be rapidly operated by drawing the exposed films past latch members into an exposed film compartment by means of tabs projecting from one end of the pack, and other objects will appear from the following specification, the novel features being particularly pointed out in the claims at the end thereof.

It is customary practice in film packs to provide a film pack casing of only slightly greater dimensions than the size of the film, and to draw the films around a curved guideway or roller at the bottom of the pack from an unexposed film chamber in the front of the pack behind an exposure window into an exposed film chamber behind a central partition in the pack. Such film packs are, of course, unsuitable for film which is relatively stiff, such as the well-known types of so-called "portrait" or "cut" films. Our present invention is particularly directed to a film pack which is suitable for either the thin flexible films or the relatively heavy inflexible films. Our pack can also be used with glass plates, although it is not primarily designed with this in mind.

Coming now to the drawings wherein like reference characters denote like parts throughout:

Fig. 4 is a front elevation of the film support removed from the film pack casing.

Fig. 5 is a similar view of the film presser with a film, and parts of the film tab and backing paper shown also in elevation and partially broken away.

Fig. 6 is an enlarged fragmentary detail sectional view showing the relation of the support and presser to the film pack casing members.

Fig. 7 is an enlarged fragmentary detail on line 7—7 of Fig. 6.

Fig. 8 is an enlarged sectional view through the light-tight film pack tab exit.

Figure 1:
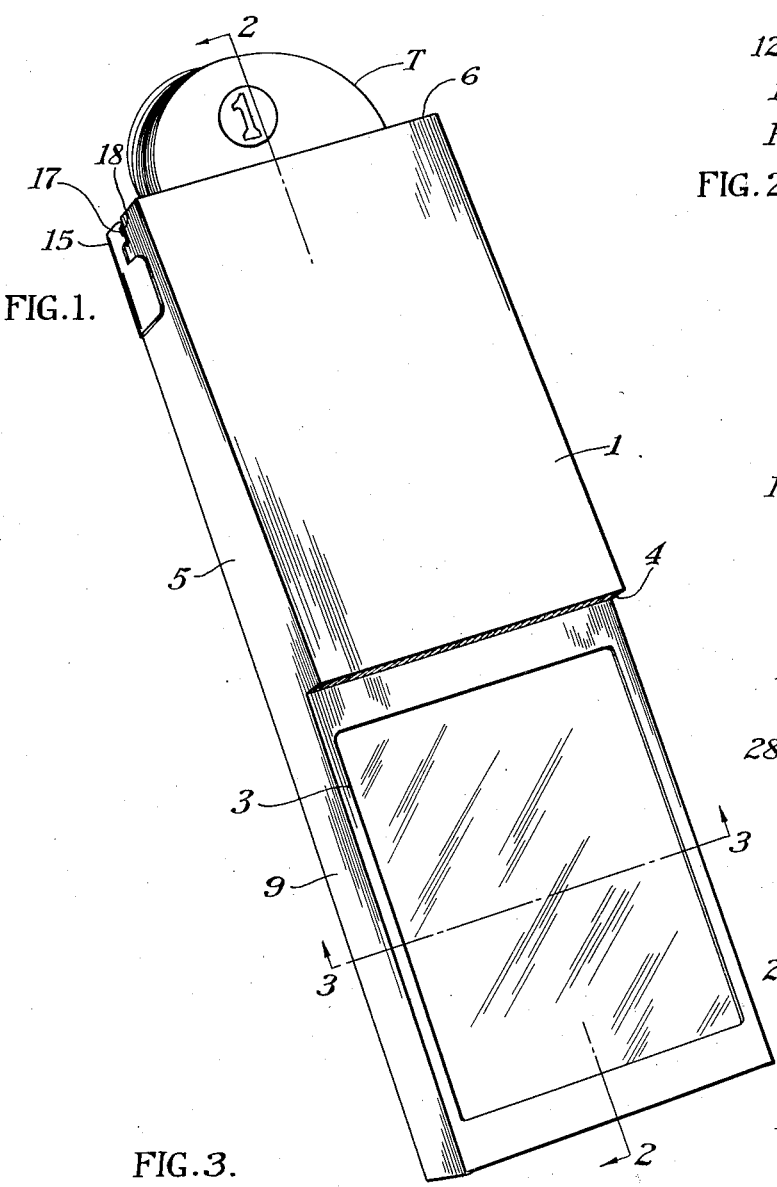
Fig. 1 is a perspective view of a film pack constructed in accordance with and embodying a preferred form of our invention.

Our improved film pack is preferably made of two elongated, shallow, box-like receptacles 1 and 2 which are so shaped that the side and end walls of one part telescope the side and end walls of the other part, as best shown in Fig. 1.

Figure 2:
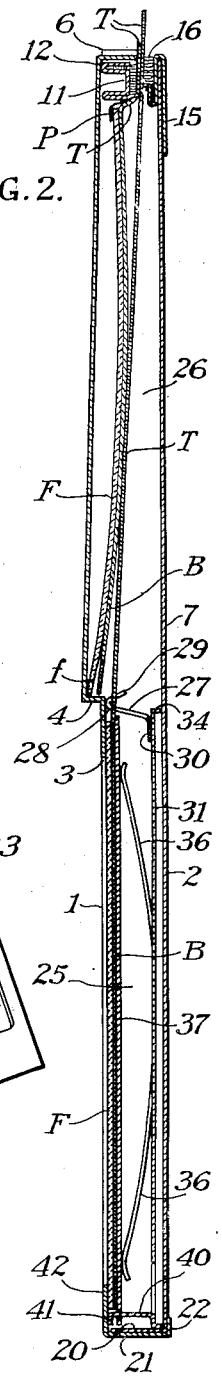
Fig. 2 is a longitudinal section on line 2—2 through the film pack shown in Fig. 1 but with most of the films and their tabs omitted for the sake of clearness.
Figure 3:
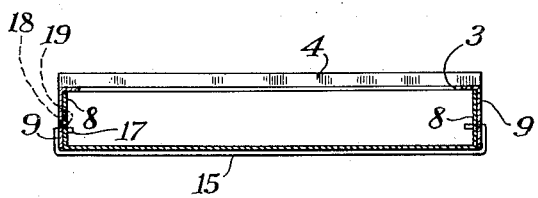
Fig. 3 is a transverse section of the film pack casing shown in Fig. 1, the mechanism inside of the pack and the films being entirely omitted.

The front section 1 is preferably provided with an exposure frame 3 behind which the films F lie and through which opening an exposure can be made. Just above the exposure frame 3 there is an offset flange or wall 4 which increases the thickness of the film pack at this point as indicated in Fig. 2. From the greatest width of the pack which occurs at the end of the wall 4, the side walls 5 taper off towards the top 6, at which place the light-tight opening for the film pack tabs is provided, as best shown in Fig. 8.

The opposite section of the film pack casing 2 has a perfectly plain rear wall 7 which extends from one end of the casing to the other. The edges 8 of this section of the pack telescope the edges 9 of section 1 and form a tight fit therewith.

At the top 6 of the film pack as indicated in Fig. 8, section 1 of the pack is provided with a light-tight tab exit formed by a pair of downwardly extending arms 10 which engage the felt covering 11 of a U-shaped member 12 which slides beneath the arms 10 up against the top of the film pack casing. The opposite part of the film pack 2 is not provided with a light-tight member since the opposite edge of the slot through which the tabs pass consists of a separate part 15 which is provided with the plush facing 16 and with a pair of downwardly extending locking lugs 17 adapted to enter the cooperating slots 18 in part 1, and 19 in part 2, to hold the end of the film pack casing sections together. The opposite ends of the casing sections are held together by the construction shown in Fig. 6. The bottom wall 20 of section 2 of the casing fits inside of the bottom wall 21 of section 1 which is provided with an upstanding flange 22 on the side opposite the exposure frame 3. Thus, when the bottom of section 2 is entered into the bottom of section 1, and the parts are brought together, the locking lugs 17 of member 15 hold the entire film pack casing together by engaging the two sets of slots 18 and 19. The construction of the light-tight tab exit above described is not a part of the present invention and is similar to film packs which have been on the market for some time. Such a construction is also shown in U. S. Patent No. 1,219,588, Ruttan & Hutchings, March 20, 1917.

The complete film pack casing formed by sections 1 and 2 as above described is divided into two compartments or sections, the lower section of which 25 is to receive the unexposed films F and the upper section of which 26 is to receive the exposed films. The films may be drawn one at a time from one section to the other by means of tabs T which, as shown in Fig. 5, are preferably made somewhat narrower than the width of the films F to which they are attached by means of pasters P. It is desirable, although not essential, that backing papers B of the same size as the film be attached to the tabs T or form a part thereof, since they materially reduce scratching as one film is moved relative to the remaining films of the pack.

In order to divide the film pack casing into unexposed and exposed film sections, we provide a pair of arms 27 which may, as indicated in Fig. 6, be conveniently made of spring material, these arms being of such a shape that they may extend across the film pack casing and touch the exposure frame 3. The outer ends 28 are preferably rounded and the metal is folded back at 29 so that these spring arms form, in effect, snap latches which will permit the films F to pass from the unexposed film chamber to the exposed film chamber, but not in an opposite direction. As indicated in Fig. 6, the spring arms 27 may flex to permit films to pass. The spring arms 27 are preferably formed on the ends of a strip 30 which extends completely across a main support 31. Openings 32 are provided in the strip 30 through which lugs 33 formed from the metal of the support 31 can be folded, as indicated in Fig. 6, to hold the spring arms in an operative position.

The support 31 preferably consists of a rectangular piece of metal having downwardly extending flanges 34 on all four sides, these flanges serving to stiffen the support and also to locate it in the film pack casing. As indicated in Figs. 6 and 7, the upper flanges 34 of the support 31 are positioned longitudinally of the film pack casing by means of protuberances 35 formed in the side walls 8 of section 2 of the film pack casing. The support 31 is unable to move longitudinally because of these protuberances 35, and since it closely fits the walls 8 in width, the support is definitely located both longitudinally and laterally.

The support flanges 34 are always pressed against the rear wall 7 of section 2 because of the spring members 36 preferably formed of the metal of the support which thrust forwardly upon a presser plate 37, this presser plate holding the stack of films F forwardly against the exposure frame 3.

In order to guide the presser plate 37, we provide a rail member 40 with a formed-over outer edge 41, this rail member passing through a slot 42 in the presser. Thus, the presser cannot move longitudinally with respect to the support 31 but may move to and from the support as the films F are moved one at a time up past the spring arms 27 into the exposed film chamber.

The operation of our film pack is as follows: After placing the film pack in a suitable film pack adapter or a camera built to receive it, a cover paper which normally lies over the exposure frame 3 may be drawn out so that the first film F is in position for exposure. After the exposure has been made, the first tab T marked "1" is drawn out, moving the film F from behind the exposure frame up past the arms 27 so that the film F may move into the exposed film chamber. The natural curvature of the film is as indicated in Fig. 2 so that the lower edge f of the film tends to move forwardly over the offset wall 4 of the exposed film chamber. In this way, the lower edges of the exposed film normally lie out of the path of the succeeding films. It is, however, not particularly material in which position the films lie in the exposed film chamber, because, while the spring arms 27 flex to permit the films to be drawn past them, the curved edges 28 of the arms contact with the exposure frame 3 and prevent films from accidentally moving in an opposite direction down into the unexposed film chamber. It is, however, very desirable to have the shoulder 4, because it gives sufficient clearance in the exposed film chamber of the film pack to receive a large number of films, such as 12, as are generally used with film packs of this type.

After one or more of the films have been exposed and drawn into the exposed film chamber, they may be removed for developing in a darkroom by drawing outwardly on the cap member 15, releasing the locking lug 7 from the pairs of slots 18 and 19 in the walls 1 and 2 of the casing. The upper ends of the casing sections can then be separated as casing 2 is drawn upwardly over flange 22 so that the exposed films may be removed, after which the sections may be reassembled and held together by the cap 15.

While it is to be understood that we have primarily designed this pack for relatively stiff film, where the word "films" is used in the specification or claims, we refer to the support for the photographically light-sensitive emulsion which may be either flexible or stiff film, or even glass plates, although, of course, if glass plates are used, the pack will either have to be made of greater width or a smaller number of plates should be used.

What we claim is:

1. In a film pack, adapted to receive a pack of films with paper tabs attached thereto, the combination with an elongated casing more than twice as long as the films contained therein, an exposure frame, a presser for holding films thereagainst, an exposed film chamber located above the exposure frame and including an offset shoulder against which an edge of the exposed films may rest, and a light tight opening in the end of the film pack through which the paper tabs may extend.

2. In a film pack, adapted to receive a pack of films with paper tabs attached thereto, the combination with an elongated casing more than twice as long as the films contained therein, an exposure frame, a presser for holding films thereagainst, an exposed film chamber located above the exposure frame and including an offset shoulder against which an edge of the exposed films may rest, and a wall tapering from the shoulder toward the upper end of the film pack to provide additional space for the exposed film chamber of the pack, and a light tight opening in the end of the pack through which the tabs of the films may pass.

3. In a film pack, adapted to receive a pack of films with paper tabs attached thereto, the combination with an elongated casing more than twice as long as the films contained therein, an exposure frame, a presser for holding films thereagainst, an exposed film chamber located above the exposure frame and including an offset shoulder against which an edge of the exposed films may rest, a wall tapering from the shoulder toward the upper end of the film pack to provide additional space for the exposed film chamber of the pack, and a light tight opening in the end of the pack through which the tabs of the films may pass and means for dividing the pack into two parts, said means permitting the passage of films to the exposed film chamber only.

4. In a film pack, the combination with an elongated two part casing in which films with tabs attached may be placed with the films and tabs extended substantially flat, of one part of said casing comprising a shallow box like receptacle including front, side and end walls, said front wall including an exposure frame and an offset wall above the exposure frame of substantially the width of the films to provide additional space for storing exposed films, the other part of said casing comprising a shallow boxlike receptacle having back, side and end walls adapted to telescope the walls of the first section, each section carrying a light lock between which the film pack tabs extend.

5. In a film pack, the combination with an elongated two part casing in which films with tabs attached may be placed with the films and tabs extended substantially flat, of one part of said casing comprising a shallow box like receptacle including front, side and end walls, said front wall including an exposure frame and an offset wall above the exposure frame of substantially the width of the films to provide additional space for storing exposed films, the other part of said casing comprising a shallow boxlike receptacle having back, side and end walls adapted to telescope the walls of the first section, each section carrying a light lock between which the film pack tabs extend and a pair of spaced clips extending between the rear and front sections for dividing the casing formed by the two sections into two chambers, one for exposed and the other for unexposed films.

6. In a film pack, the combination with an elongated two part casing in which films with tabs attached may be placed with the films and tabs extended substantially flat, of one part of said casing comprising a shallow boxlike receptacle including front, side and end walls, said front wall including an exposure frame and an offset wall above the exposure frame of substantially the width of the films to provide additional space for storing exposed films, the other part of said casing comprising a shallow boxlike receptacle having back, side and end walls adapted to telescope the walls of the first section, each section carrying a light lock between which the film pack tabs extend and a pair of spaced clips extending between the rear and front sections for dividing the casing formed by the two sections into two chambers, one for exposed and the other for unexposed films, said clips extending from one section to the other and forming shoulder stops for the films in the unexposed film chamber over which said films may be drawn by their tabs.

7. In a film pack, the combination with an elongated two part casing in which films with tabs attached may be placed with the films and tabs extended substantially flat, of one part of said casing comprising a shallow boxlike receptacle including front, side and end walls, said front wall including an exposure frame and an offset wall above the exposure frame of substantially the width of the films to provide additional space for storing exposed films, the other part of said casing comprising a shallow boxlike receptacle having back, side and end walls adapted to telescope the walls of the first section, each section carrying a light lock between which the film pack tabs extend and a pair of spaced clips extending between the rear and front sections for dividing the casing formed by the two sections into two chambers, one for exposed and the other for unexposed films, said clips extending from one section to the other and forming shoulder stops for the films in the unexposed film chamber over which said films may be drawn by their tabs, said clips being made of resilient material and being adapted to press resiliently upon an edge of the exposure frame.

8. In a film pack casing adapted to receive films to which paper tabs are attached, the combination of an elongated housing, comprising a pair of shallow boxlike receptacles, one adapted to fit inside of the other, one having an exposure frame and an offset wall above the exposure frame forming an additional space for exposed films and adapted to receive films drawn from the exposure frame by their tabs, a pressure plate behind the exposure frame, a support including spring arms for thrusting the pressure plate toward the exposure frame, and a pair of spaced arms carried by the support and adapted to engage a portion of the exposure frame and also adapted to pass films from the exposure frame to the exposed film chamber.

9. In a film pack casing adapted to receive films to which paper tabs are attached, the combination of an elongated housing, comprising a pair of shallow boxlike receptacles, one adapted to fit inside of the other, one having an exposure frame and an offset wall above the exposure frame forming an additional space for exposed films and adapted to receive films drawn from the exposure frame by their tabs, a pressure plate behind the exposure frame, a support including spring arms for thrusting the pressure plate toward the exposure frame, and a pair of spaced arms carried by the support and adapted to engage a portion of the exposure frame and also adapted to pass films from the exposure frame to the exposed film chamber, said arms including rounded edges for engaging the exposure frame the rounded edges being formed by bending the ends of said arms away from the exposure frame.

10. In a film pack casing adapted to receive films to which paper tabs are attached, the combination of an elongated housing comprising a pair of shallow boxlike receptacles, one adapted to fit inside of the other, one having an exposure frame and an offset wall above the exposure frame forming an additional space for exposed films and adapted to receive films drawn from the exposure frame by their tabs, a pressure plate behind the exposure frame, a support including spring arms for thrusting the pressure plate toward the exposure frame, and a pair of spaced spring arms carried by the support and adapted to engage a portion of the exposure frame and also adapted to pass films from the exposure frame to the exposed film chamber.

11. In a film pack casing adapted to receive films to which paper tabs are attached, the combination of an elongated housing comprising a pair of shallow boxlike receptacles, one adapted to fit inside of the other, one having an exposure frame and an offset wall above the exposure frame forming an additional space for exposed films and adapted to receive films drawn from the exposure frame by their tabs, a pressure plate behind the exposure frame, a support including spring arms for thrusting the pressure plate toward the exposure frame, and a pair of spaced spring arms carried by the support and adapted to engage a portion of the exposure frame and also adapted to pass films from the exposure frame to the exposed film chamber, said spring arms being carried by a strip attached to and extending across one end of the support.

12. In a film pack casing, the combination with an elongated substantially rectangular housing comprising two shallow box-like receptacles adapted to fit one within the other, one section including an exposure frame, and an offset wall at one edge thereof to provide additional space for storing exposed films, said casings being adapted to receive between them a series of films substantially as wide as the casing and having tabs attached to the films at the center portions thereof of somewhat less width than the films, a pair of arms dividing the housing into two sections, one for unexposed films behind the exposure frame and the other for exposed films above the offset wall, the arms being spaced apart a distance sufficient for the paper tabs to pass therebetween.

13. In a film pack casing, the combination with an elongated substantially rectangular housing comprising two shallow box-like receptacles adapted to fit one within the other, one section including an exposure frame, and an offset wall at one edge thereof to provide additional space for storing exposed films, said casings being adapted to receive between them a series of films substantially as wide as the casing and having tabs attached to the films at the center portions thereof of somewhat less width than the films, a pair of resilient arms dividing the housing into two sections, one for unexposed films behind the exposure frame and the other for exposed films above the offset wall, the arms being spaced apart a distance sufficient for the paper tabs to pass between, the resilient arms engaging films drawn from the unexposed to the exposed film sections, flexing to let the films pass.

14. In a film pack casing, the combination with an elongated substantially rectangular housing comprising a pair of shallow boxlike receptacles adapted to fit one within the other, one section including an exposure frame, a support located behind the exposure frame including a member having a base plate, a flange extending around the edges of the base plate, springs extending from the base plate, a presser plate guided upon the support and normally thrust therefrom by the springs of the base plate, and arms carried by an edge of the base plate and extending over the presser plate for dividing the casing into two parts, one part for unexposed film behind the exposure frame, and the other part for exposed film above the arms of the base plate.

15. In a film pack casing, the combination with an elongated substantially rectangular housing comprising a pair of shallow box-like receptacles adapted to fit one within the other, one section including an exposure frame, a support located behind the exposure frame including a member having a base plate, a flange extending around the edges of the base plate, springs extending from the base plate, a presser plate guided upon the support and normally thrust therefrom by the springs of the base plate, and resilient arms carried by an edge of the base plate and extending over the presser plate for dividing the casing into two parts, one part for unexposed film behind the exposure frame, and the other part for exposed film above the arms of the base plate, and protuberances on the film pack casing for locating the base plate in the unexposed film part.

16. In a film pack casing adapted to support films and backing papers, the combination with a housing for the films of at least twice the length of the films and of a width sufficient to permit the films to slide freely therein, of an exposure frame in one part of the casing and a storage chamber in the other part thereof, means for dividing the housing into the said two parts comprising a pair of spaced spring latches, said latches being adapted to flex to permit films to pass from one part to the other and being adapted to prevent films from moving in the opposite direction.

J. HENRY S. PARKER.
WILLIAM N. SCHULER.